United States Patent [19]

Koehn

[11] 4,101,162

[45] Jul. 18, 1978

[54] VERTICALLY SWINGABLE CAMPER SHELL

[76] Inventor: Leland Koehn, 211 E. Panta 7E, Halstead, Kans. 67056

[21] Appl. No.: 757,485

[22] Filed: Jan. 6, 1977

[51] Int. Cl.² ............................................. B60P 3/42
[52] U.S. Cl. .................................. 296/137 B; 52/66; 296/100; 296/23 MC
[58] Field of Search ................. 296/23 MC, 100, 102, 296/137 B; 312/271, 272, 373; 52/66

[56] References Cited

U.S. PATENT DOCUMENTS

| | | | |
|---|---|---|---|
| 3,051,523 | 8/1962 | Boyce-Smith | 296/100 |
| 3,506,300 | 4/1970 | Remmert | 52/66 |
| 3,850,470 | 11/1974 | Trelle | 52/66 |

*Primary Examiner*—Philip Goodman

*Attorney, Agent, or Firm*—Schmidt, Johnson, Hovey & Williams

[57] ABSTRACT

A specially constructed hinge, mounted within the open body of a light truck, pivotally supports a body-enclosing, box-type shell behind the truck cab for vertical swinging movement of the shell about an axis extending transversely of the truck adjacent the uppermost portion of the cab end of the shell whereby the shell may be swung selectively up or down to open or close the body without encountering interference between the shell and cab. The hinge comprises a pair of parallel, upright, laterally spaced plates each secured to a respective sidewall of the truck body and defining a pair of spaced, arcuate, non-concentric slots for captively retaining corresponding rollers carried by depending structure on said shell. An electric winch selectively retracts or releases cable and pulley assemblies associated with respective pairs of rollers for powered raising or lowering of the shell relative to the truck body.

10 Claims, 5 Drawing Figures

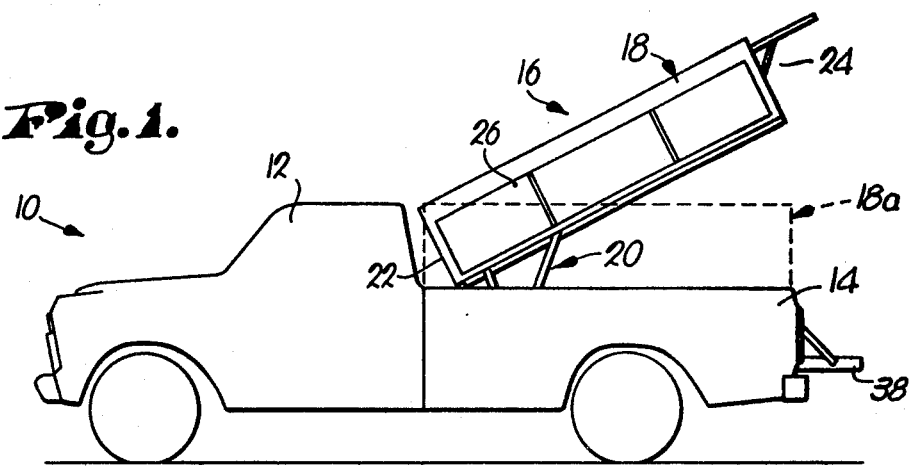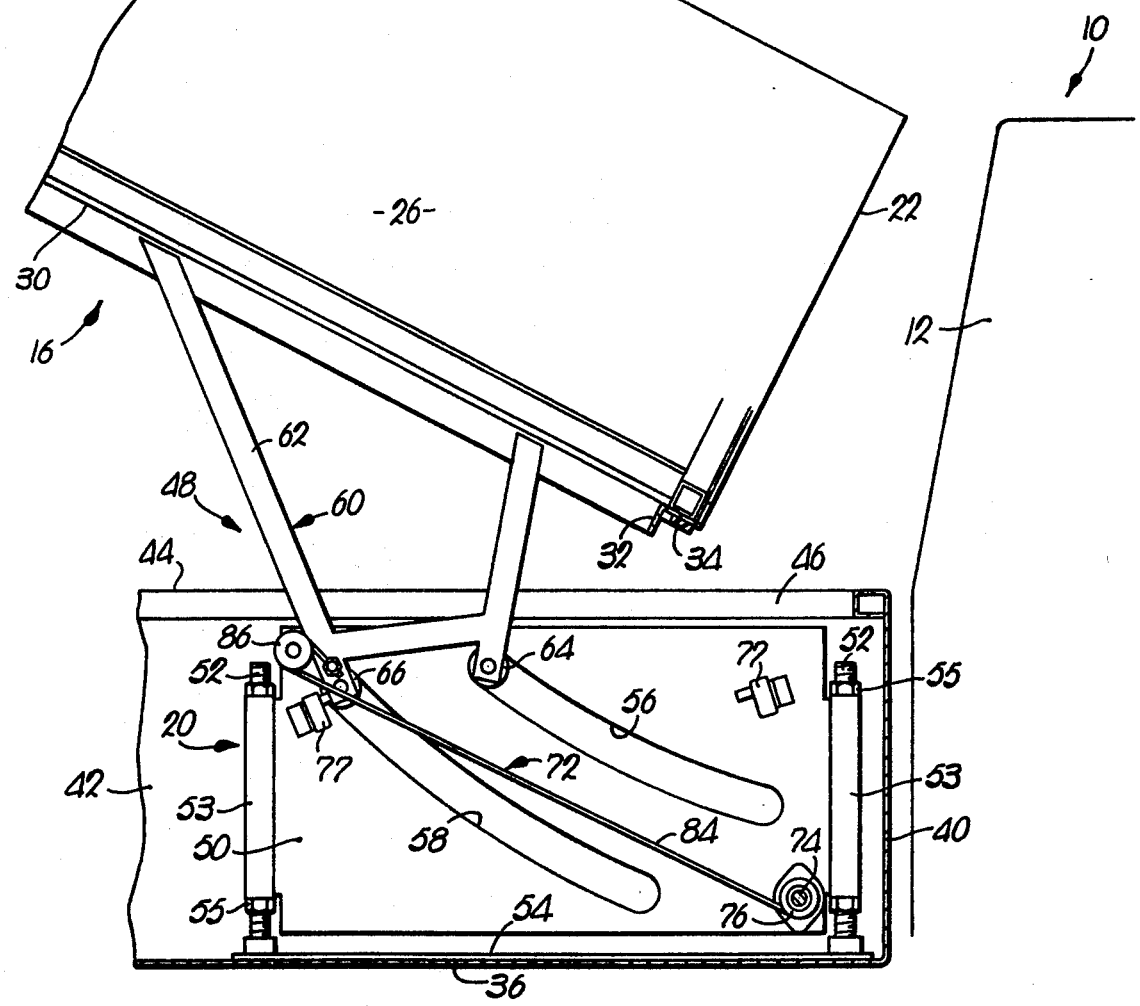

VERTICALLY SWINGABLE CAMPER SHELL

This invention relates to camper-type covers for lightweight trucks and the like and, more particularly, deals with a "cab-high" cover in the form of a box-like shell uniquely mounted to the bed of a truck in such a manner as to permit vertical swinging movement of the shell about an axis adjacent the cab without interference between the cab and the shell.

Camper tops and closures for light-duty trucks such as pickup trucks and the like are, of course, well known in the art and there have been various mounting arrangements devised for securing the camper tops in closing relationship to the body of the truck in such a manner that there may be provided selective access to the truck body. Camper covers can be segregated into two general categories: the full size walk-in campers which provide adequate headroom to accommodate an average person in the upright position, and the low-profile campers which offer handling and fuel-saving advantages but provide very little headroom such that access to the interior of the camper is awkward, particularly in the forwardmost areas. The present invention concerns a low-profile camper which provides for improved access by virtue of a hinge assembly which supports the cover for vertical, fore-and-aft swinging movement to open and close the truck body.

Vertically swingable camper covers are shown in prior art such as U.S. Pat. No. 3,762,762, issued to Beveridge, et al, and U.S. Pat. No. 3,785,698, issued to Dean, et al. However, the devices disclosed in the cited patents concern flat camper tops, whereas the present invention relates to vertical swinging movement in a box-like camper shell having depth as well as width and length. It will be appreciated that the problems presented in so mounting a box-like cover are significantly different than those relating to mounting a flat cover since there must be some provision made for avoiding interference between the box-like shell and the cab during swinging movement of the shell. Simply mounting a box-like shell in a manner similar to the flat covers shown in Beveridge and Dean will result in an unworkable device because the shell will interfere with the cab when it is attempted to swing the shell vertically.

Accordingly, it is an important object of the present invention to provide a box-like shell with a hinge assembly which pivotally supports the shell to the body of the truck in such a manner that the shell may be swung vertically about an axis adjacent the cab of the truck without interference between the cab and shell.

It is further important object of the present invention to provide a device as above wherein a pair of arcuate tracks are secured to the truck body for captively engaging a pair of corresponding rollers supported on the box-like shell.

It is another important object of the instant invention to provide a device as above wherein the hinge assembly is positioned below the camper shell and has no portion extending into the interior of the shell.

It is yet another important object of the present invention to provide a device of the type described above wherein there is included a spring-assisted, winch-type lift mechanism for effecting powered up-and-down swinging movement of the shell.

In the drawings:

FIG. 1 is a side elevational view of a cover constructed in accordance with the principles of the present invention and showing the camper shell in its opened and closed positions;

FIG. 2 is an enlarged, partial, longitudinal cross-sectional view of the cover showing the shell in the opened position;

Figure 3:
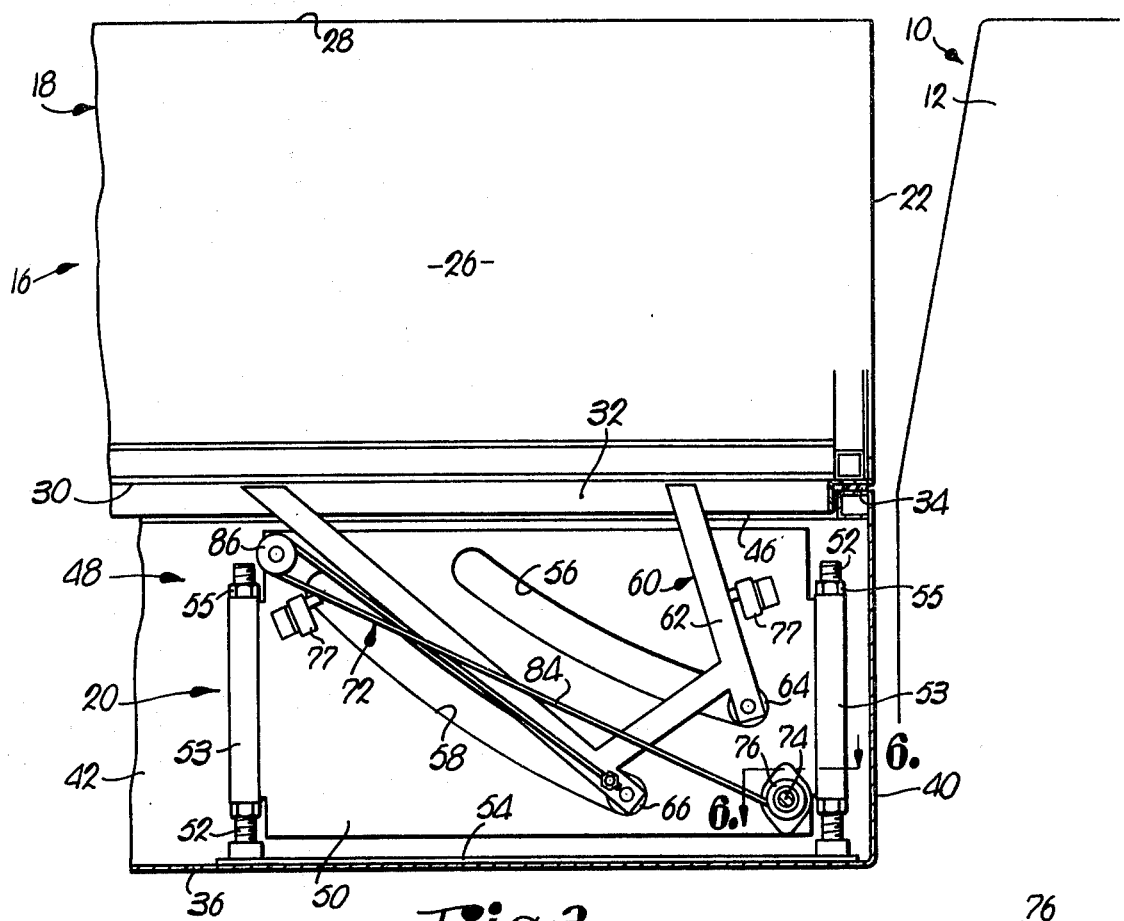
FIG. 3 is an enlarged, partial, longitudinal cross-sectional view of the cover showing the shell in its closed position.
Figure 5:
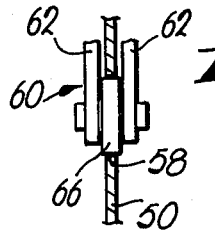
FIG. 5 is an enlarged, partial, cross-sectional view showing a typical roller in engagement with its respective track.
Figure 6:
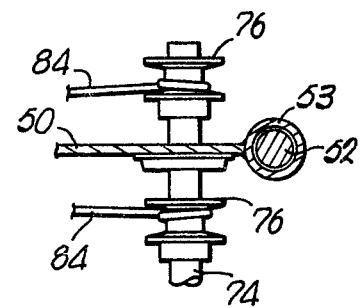
FIG. 6 is an enlarged, cross-sectional view taken along line 6—6 of FIG. 3.
Figure 4:
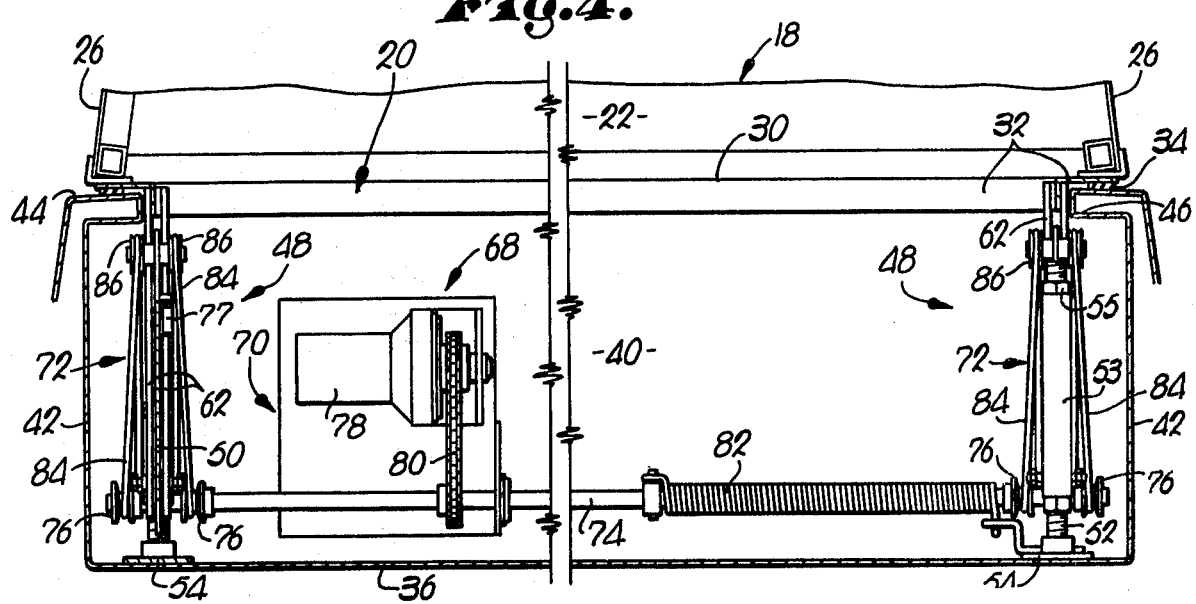
FIG. 4 is an enlarged, partial, transverse cross-sectional view of the cover shown in FIG. 1.

In FIG. 1 there is shown a conventional light-duty pickup truck 10 having a forwardly disposed cab 12, and a rearwardly carried body 14 supporting an overlying vertical swingable cover 16. The cover 16 comprises a box-like, open-bottomed shell 18, and a hinge assembly 20 and which pivotally mounts the shell 18 to the body 14 for swinging movement between an open position, as shown in FIG. 1, and a closed position as designated 18a and shown in broken lines (only in FIG. 1).

The shell 18 is preferably of rectangular construction having a normally upright, transversely extending forward end 22 arranged for disposition adjacent cab 12, an opposed rear end 24, a pair of opposed sidewalls 26, and a rectangular flat top 28 rigidly secured to the ends 22 and 24 and sidewalls 26. As previously mentioned, the shell 18 has an open bottom 30, and there is provided a lip 32 of L-shape cross-section extending around the entire periphery of the bottom 30. The lower face of the lip 32 has a continuous seal 34 of resilient material extending along the full perimeter of the lip 32 for forming a weathertight seal with the body 14 when the shell 18 is in its closed position.

The body 14 is of typical construction comprising a bed 36, a swingable tail gate 38 at the rear end of bed 36, a forward wall 40, and a pair of sidewalls 42 extending between tail gate 38 and the forward wall 40. Additionally, the bed 14 has an open, substantially rectangular top 44 corresponding in dimension to the open bottom 30 of shell 18, and circumscribed by an uppermost rail 46 disposed in reinforcing relationship to the uppermost ends of sidewalls 42 and forward wall 40.

The hinge assembly 20 comprises a pair of cam mechanisms 48 positioned on opposite sides of the body 14 and operably coupling the latter to the shell 18. The mechanisms 48 are identical in construction and accordingly, only one of the mechanisms 48 will be described herein.

The mechanism 48 includes a cam plate 50 mounted adjacent sidewall 42 in an upright, fore-and-aft extending relationship to the latter. The plate 50 is rigidly secured to bed 36 by a pair of upright, spaced, heavy-duty machine bolts 52 mounted on the bed 36 by a base 54. As seen in FIGS. 2 and 3, the bolts 52 extend through respective tubular mounting brackets 53 on opposite ends of plate 50 and each bolt 52 has a pair of positioning nuts 55 above and below its corresponding bracket 53. In this manner, the vertical position of plate 50 relative to the bed 36 may be easily adjusted by selective positioning of nuts 55.

The plate 50 has arcuate upper and lower slots 56 and 58 formed therein to define a pair of tracks for a purpose to be described hereinbelow. The slots 56 and 58 are upwardly arcuate lying along segments of respective arcs swung from center points adjacent the juncture between forward end 22 and top 28 of the shell 18. In the preferred embodiment, the slots 56 and 58 are of about the same radius but are not concentric.

The cam mechanism 48 further includes depending structure 60 mounted along the lowermost portion of sidewall 26 and disposed to overlie the cam plate 50. The structure 60 comprises a pair of identical, transversely spaced, support frames 62, and a pair of rollers 64 and 66 respectively mounted on the frames 62 for rotation about spaced transverse axes extending between the frames 62 at the lowermost end of the latter. The rollers 64, 66 are carried in rolling engagement with the tracks presented by slots 56 and 58.

The arrangement of rollers 64 and 66 relative to the slots 56 and 58 is such that when shell 18 is disposed in its closed position overlying body 14, as shown in FIG. 3, the roller 64 is disposed in the forwardmost portion of slot 56 and the roller 66 is similarly disposed in the forwardmost portion of its corresponding slot 58. Each of the rollers 64 and 66 is captively held within its corresponding slot 56, 58 by virtue of the fact that the frames 62 are disposed on opposite sides of the upright plate 50 such that the rollers 64, 66 are precluded from moving laterally relative to the plate 50 and thereby are constrained to movement within the respective slots 56 and 58.

It is important to note that, as shown in the drawings, the rollers 64 and 66 are substantially the same diameter as the width of the corresponding slots 56 and 58. In this manner, the rollers 64 and 66 may ride upon either the upper or lower arcuate surface presented by the slots 56 and 58 as required during swinging movement of the shell 18. It should be understood that the hinge assembly 20 is the sole support of the shell 18 during swinging movement of the latter relative to the body 14. Hence, the above-described relationship between the slots 56 and 58, and the rollers 64 and 66 is necessary to provide the required stability to the hinge assembly 20.

A lift mechanism 68 is provided for powered swinging movement of the shell 18 relative to the body 14. Mechanism 68 includes a winch 70 and a pair of spaced cable and pulley assemblies 72 extending between the winch 70 and respective depending structures 60 of hinge assembly 20. The winch 70 includes an elongate drive shaft 74 extending transversely of bed 14 between the respective cam plates 50 and carrying a pair of take-up reels 76 at each end thereof. An electric motor 78 is operably coupled to the shaft 74 through a chain and sprocket assembly 80 and there is provided a torsion spring 82 along the length of shaft 74 for augmenting the torque from motor 78 when the shaft 74 is driven in a direction to lift the shell 18.

Each cable and pulley assembly has a pair of cables 84 operably coupled with a respective take-up reel 76 and trained around a double pulley 86 supported at the upper rearmost end of plate 50 for rotation about a transversely extending axis. Additionally, each of the cables 72 is secured at one end to the depending structure 60 adjacent roller 66 such that winding and unwinding of the cables 72 about take-up reels 76 serves to selectively raise and lower the shell 18. For example, as viewed in FIG. 2, counterclockwise movement of shaft 74 and reels 76 effects shortening of the cables 72 and consequent upward movement of the shell 18. In the preferred embodiment, limit switches 77 are electrically coupled with the motor 78 in a conventional manner to automatically stop the motor 78 when the rollers 64, 66 reach the uppermost or lowermost ends of slots 56, 58.

In operation, the cover 16 is normally disposed with the shell 18 positioned as shown in the position designated 18a in FIG. 1, and the hinge mechanism disposed as shown for example, in FIG. 3. This, of course, is the lowermost, closed position for the shell 18 which is normally maintained during travel and storage of the truck 10.

When it is necessary to load or unload the body 14 of truck 10, it may be desirably to swing the shell 18 to a position as shown in solid lines in FIG. 1 such that there is provided unobstructed access to the body 14. In such instances, the operator simply actuates the winch 70, causing reels 76 to wind up the cables 72 whereby rollers 64 and 66 move upwardly and rearwardly in their corresponding slots 56 and 58. This action causes swinging movement of the shell 18 which continues until the latter reaches a position as shown in FIG. 2, whereupon the body 14 is substantially uncovered, providing easy access to the materials carried therein.

At this juncture, it is important to understand the unique arrangement of slots 56, 58 which impart the desired motion to shell 18 whereby the latter may be swung vertically without encountering interference with the cab 12. In this connection, the slots 56, 58 are arranged such that initial movement of the shell 18 is rearward as well as upward so that the seal 34 may be gently released from its engagement with rail 46 to prevent damage to the seal 34. Further movement of the shell 18 is such that the latter pivots about an axis extending transversely of the body 14 adjacent the juncture between the forward end wall 22 and top 28. It is important to note that that unless the swinging movement takes place as described, there will be interference between the shell 18 and the cab 12 when it is attempted to swing the shell 18 vertically.

From the foregoing, it may be appreciated that there is presented a simple and effective device for supporting a box-like shell on a pickup truck or the like in such a manner that the shell may be swung vertically for providing unobstructed access to the body of the truck. With such an arrangement, the operator may easily load and unload even the forwardmost section of the truck without backbreaking pushing and shoving of heavy material while awkwardly doubled up as required in the close confines presented by conventional cab-high shells. The present invention offers all of the traditional advantages of cab-high campers yet additionally provides loading and unloading advantages found heretofore only in full-sized campers.

Further, the present invention accomplishes all of the above described benefits without the need for bulky structure extending into the interior of the shell so that the load-carrying capacity of the truck is only minimally reduced. The unique winch-type lift mechanism presents a means for powered swinging movement of the shell without the necessity of cumbersome and expensive hydraulic equipment.

Having thus described the invention, what is claimed as new and desired to be secured by Letters Patent is:

1. In combination with a light truck of the type having an open-topped body and a cab at one end of said body extending upwardly beyond said top, a cover for the top including:

a hollow, open-bottomed, box-like shell on said body overlying said top in normally closing relationship to the latter, said shell including an upright end wall adjacent said cab and extending transversely of the truck; and hinge means mounting said shell on said body for swinging vertical movement of the shell about a fixed transversely extending axis adjacent the uppermost portion of said end wall whereby said shell may be selectively shifted from its closing relationship over said top to permit unobstructed access to the body of the truck.

2. The invention as claimed in claim 1, wherein said hinge means is disposed wholly outside said hollow shell.

3. The invention of claim 2, wherein said hinge means underlies said shell.

4. The invention as claimed in claim 1; and a lift mechanism for powered swinging movement of said shell.

5. The invention of claim 4, wherein said lift mechanism includes an electric winch.

6. The invention as claimed in claim 5, said lift mechanism including a spring assist disposed to augment the lifting action of said winch during upward swinging of said shell.

7. The invention of claim 1, wherein said hinge means includes a pair of spaced, arcuate tracks attached to said body, and depending structure on said shell supporting a pair of rollers adapted for captive engagement with said respective tracks.

8. In combination with a light truck of the type having an open-topped body and a cab at one end of said body extending upwardly beyond said top, a cover for the top including:

a hollow, open-bottomed, box-like shell on said body overlying said top in normally closing relationship to the latter, said shell including an upright end wall adjacent said cab and extending transversely of the truck; and hinge means mounting said shell on said body for swinging vertical movement of the shell about a transversely extending axis adjacent the uppermost portion of said end wall whereby said shell may be selectively shifted from its closing relationship over said top to permit unobstructed access to the body of the truck, said hinge means including a pair of spaced, arcuate tracks attached to said body, and depending structure on said shell supporting a pair of rollers adapted for captive engagement with said respective tracks, wherein said tracks are coplanar comprising arcuate slots formed in an upstanding plate extending longitudinally of the truck.

9. The invention as claimed in claim 8, wherein said arcuate slots are non-concentric.

10. The invention as claimed in claim 8, wherein the width of each of said slots is substantially equal to the diameter of their respective rollers.

* * * * *